Nov. 6, 1934.  C. R. SHORT  1,979,498
COMPOSITE PISTON
Filed July 8, 1929

Inventor
Charles R. Short
By Spencer Hardman & Fehr
His Attorneys

Patented Nov. 6, 1934

1,979,498

UNITED STATES PATENT OFFICE 1,979,498

COMPOSITE PISTON

Charles R. Short, Dayton, Ohio, assignor, by mesne assignments, to General Motors Corporation, Detroit, Mich., a corporation of Delaware Application July 8, 1929, Serial No. 376,548

3 Claims. (Cl. 309—14)

This invention relates to composite pistons having a main body portion of one metal and a bearing portion of a different metal or material.

An object of this invention is to provide such a composite piston wherein the lateral bearing portions are relatively thin and fixed to the main portion in good heat conducting relation.

Another object is to provide such lateral bearing portions of a self-lubricating material, such as a porous metal having a great oil absorbing capacity, and preferably containing graphite.

A more specific object is to provide a bearing portion of a self-lubricating porous material composed of powdered materials, such as various combinations of copper, tin, zinc and graphite, or other materials.

Further objects and advantages of the present invention will be apparent from the following description, reference being had to the accompanying drawing, wherein a preferred embodiment of one form of the present invention is clearly shown.

In the drawing.

Similar reference characters refer to similar parts throughout the various views.

Figure 1:
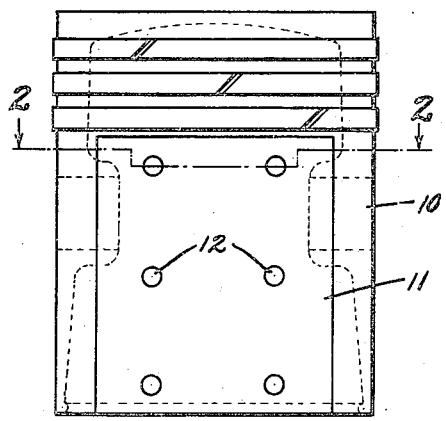
Fig. 1 is a side elevation of an automobile engine piston made according to this invention.
Figure 2:
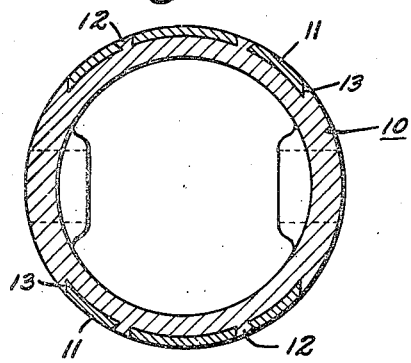
Fig. 2 is a section on line 2—2 of Fig. 1.

Referring to Figs. 1 and 2, 10 designates the main body portion of the piston which is shown as having the head and skirt cast in one piece. 11 designates two opposed bearing plates which are preformed and inserted within the casting die and the body portion 10 cast therearound, thereby causing the bearing plates 11 to be firmly fixed or bonded to the body portion 10. As illustrated in Fig. 2, bearing plates 11 may have tapered apertures therein through which the metal of body 10 flows during casting and thereby forms the retaining lugs 12 which firmly lock plate 11 to body 10. Also the edges of plate 11 may be tapered or dovetailed, as clearly illustrated, so that the cast metal will overlie said edges at the portions 13 and thus aid in locking plate 11 more securely to body 10.

Preferably the plates 11 are of porous metal, preferably constructed by briquetting a mixture of bronze-forming metal powders, a filler such as graphite and a volatile void-forming substance such as salicylic acid, and then sintering this form under non-oxidizing conditions at a temperature and for a time sufficient to cause the metal particles to unite and the void forming substance to volatilize and produce a metal structure interspersed with a large number of minute inter-communicating voids for receiving lubricant. Examples of the manufacture of such porous metals are disclosed in Patent 1,642,347 issued Sept. 13, 1927, to Harry M. Williams. Examples of making relatively thin sheets or plates of porous metal are disclosed in my copending application, Serial No. 188,930, filed May 5, 1927. Further examples of making a self-lubricating bearing material are disclosed in Patent 1,556,658, issued Oct. 13, 1925, to Harry M. Williams. The bearing plates 11 of the present invention may be made by any suitable and known method, such as disclosed in the above prior application and patents.

Preferably the bearing plates 11 are bonded by an alloy bond to the cast body 10. When the plates 11 are of porous bronze and the body 10 of cast aluminum or aluminum alloy, the alloy bond is preferably obtained by first coating the inside surfaces of plates 11 with zinc. Then when the body 10 is cast thereupon, the zinc coating will alloy with the bronze on one surface thereof, and the aluminum on the opposite surface thereof, thus providing a strong mechanical bond as well as a good thermal bond whereby heat may be rapidly conducted away from the plates 11. The piston illustrated in Figs. 1 and 2 may be the above described cast aluminum piston with porous bronze bearing plates 11, or, if desired, when such alloy bond is obtained, the interlocking portions 12 and 13 may be dispensed with.

Instead of casting the body portion to the bearing plates, the body portion may be first cast and provided with suitable recesses for receiving the bearing plates, and the preformed bearing plates then fitted into said recesses and bonded to the body portion by using an intervening layer or coating of a lower melting metal or alloy as a bonding medium. In such cases the parts are forced firmly together by suitable means and then raised to a temperature which will cause the bonding medium to fuse, or partially fuse and alloy with the metal held compressed against both sides thereof. Examples of this method of bonding a bearing portion to a backing portion is disclosed and claimed in my copending application, Serial No. 360,074, filed May 3, 1929.

Another method of securing the bearing plates to the body portion of the piston is by suitable mechanical means, such as by screws, rivets or the like.

Figure 3:
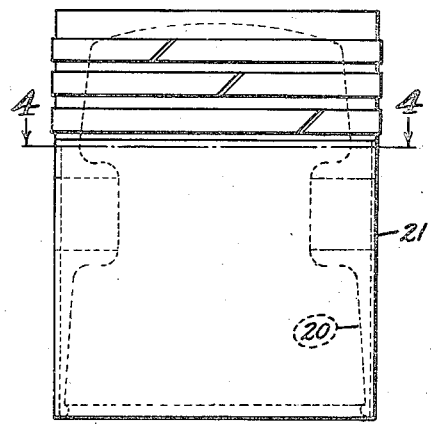
Fig. 3 is a view similar to Fig. 1, but shows a modified form.
Figure 4:
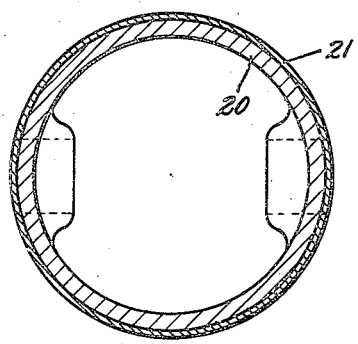
Fig. 4 is a section on line 4—4 of Fig. 3.

Figs. 3 and 4 illustrate a modified form of the invention wherein, instead of using two separate bearing plates, a cylindrical bearing portion 21 surrounds the skirt of the main body portion 20 of the piston. This bearing portion 21 may be made by any of the methods described above for making the smaller bearing plates 11. Also bearing portion 21 may be bonded or secured to the body portion 20 by the same or similar means described above for securing plates 11 to the body portion 10. Preferably bearing portion 21 is of porous bronze securely bonded to portion 20 by an intervening layer or coating of a lower melting metal or metals which will alloy with both the contacting metal surfaces during the bonding heat treatment and thereby form a good bonding alloy having a higher melting point after the bonding heat treatment than it did before.

While the form of embodiment of the present invention as herein disclosed, constitutes a preferred form, it is to be understood that other forms might be adopted, all coming within the scope of the claims which follow.

What is claimed is as follows:

1. A self-lubricating composite piston capable of self-lubrication for a substantial period of time in the event of failure of the oil supply thereto, comprising: a cast main body portion of aluminum or aluminum alloy and a lubricant-impregnated porous bronze bearing plate bonded to the piston skirt by an intervening thin layer of zinc molecularly alloyed with both said skirt and bearing plate, whereby to provide a continuous molecularly unbroken heat-conducting path between said main body and bearing plate throughout their contacting areas.

2. A self-lubricating composite piston capable of self-lubrication for a substantial period of time in the event of failure of the oil supply thereto, comprising: a cast aluminum main body portion and a lubricant-impregnated porous bronze bearing plate molecularly bonded thereto by an intervening thin layer of zinc so alloyed with the aluminum and bronze that its melting point is materially higher than that of pure zinc whereby to provide a higher melting point alloy union between said main body and bearing plate.

3. A self-lubricating composite piston capable of self-lubrication for a substantial period of time in the event of failure of oil supply thereto, comprising: a main body portion and a lubricant-impregnated porous bronze bearing plate bonded thereto by an intervening thin layer of zinc molecularly alloyed with said body portion on one side and said bearing plate on the other side thereof, whereby to provide a molecular heat-conducting union between said main body and bearing plate.

CHARLES R. SHORT.